(12) United States Patent
Shelnut et al.

(10) Patent No.: US 7,072,563 B2
(45) Date of Patent: Jul. 4, 2006

(54) WAVEGUIDE COMPOSITIONS AND WAVEGUIDES FORMED THEREFROM

(75) Inventors: James G. Shelnut, Lancaster, MA (US); Nicola Pugliano, Grafton, MA (US); Matthew L. Moynihan, Sterling, MA (US); Hai Bin Zheng, Shrewsbury, MA (US); Daniel E. Lundy, Winchendon, MA (US); Nathan Pawlowski, Taunton, MA (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 0 days.

(21) Appl. No.: 10/993,069

(22) Filed: Nov. 19, 2004

(65) Prior Publication Data

US 2005/0141839 A1    Jun. 30, 2005

Related U.S. Application Data

(60) Provisional application No. 60/524,820, filed on Nov. 25, 2003.

(51) Int. Cl.
| | |
|---|---|
| G02B 6/00 | (2006.01) |
| G02B 6/10 | (2006.01) |
| G02B 6/02 | (2006.01) |
| G03C 5/00 | (2006.01) |
| G03C 1/76 | (2006.01) |
| G03C 1/492 | (2006.01) |
| G03C 1/494 | (2006.01) |

(52) U.S. Cl. .............. 385/143; 385/141; 385/142; 385/144; 385/145; 385/123; 385/124; 385/126; 385/127; 385/128; 430/269; 430/270.1; 430/271.1; 264/1.24

(58) Field of Classification Search ................ 385/139, 385/143, 147, 142, 123, 124, 126–128; 430/269, 430/270.1, 271.1; 264/1.24
See application file for complete search history.

(56) References Cited

U.S. PATENT DOCUMENTS 5,200,487 A    4/1993    Lagarde et al. ............... 528/21

(Continued)

FOREIGN PATENT DOCUMENTS

JP    57-168246    10/1982

(Continued)

OTHER PUBLICATIONS

Copy of European Search Report of corresponding European Application No. EP 04 25 7060; Mar. 15, 2005.

(Continued)

*Primary Examiner*—Brian Healy
*Assistant Examiner*—Charlie Peng
(74) *Attorney, Agent, or Firm*—Jonathan D. Baskin

(57) ABSTRACT

Provided are compositions suitable for use in forming a flexible optical waveguide. The compositions include a polymer, having units of the formula $(RSiO_{1.5})$, wherein R is a substituted or unsubstituted organic group, and a plurality of functional end groups. A first component is provided for altering the solubility of the composition in a dried state upon activation. A second component contains a plurality of functional groups chosen from hydroxy, amino, thiol, sulphonate ester, carboxylate ester, silyl ester, anhydride, aziridine, methylolmethyl, silyl ether, and combinations thereof. The second component is present in an effective amount to improve flexibility of the composition in a dried state before and after activation. Also provided are flexible optical waveguides, methods of forming flexible optical waveguides and electronic devices that include a flexible optical waveguide.

20 Claims, 2 Drawing Sheets

U.S. PATENT DOCUMENTS

| | | | |
|---|---|---|---|
| 5,378,585 A | 1/1995 | Watanabe | 430/176 |
| 5,457,003 A | 10/1995 | Tanaka et al. | 430/176 |
| 5,554,465 A | 9/1996 | Watanabe | 430/5 |
| 5,612,170 A | 3/1997 | Takemura et al. | 430/270.1 |
| 5,672,672 A | 9/1997 | Amano et al. | 528/16 |
| 6,054,253 A | 4/2000 | Fardad et al. | 430/321 |
| 6,087,064 A | 7/2000 | Lin et al. | 430/270.1 |
| 6,088,492 A | 7/2000 | Kaneko et al. | 385/14 |
| 6,144,795 A | 11/2000 | Dawes et al. | 385/141 |
| 6,251,486 B1 | 6/2001 | Chandross et al. | 427/387 |
| 6,344,305 B1 | 2/2002 | Lin et al. | 430/270.1 |
| 6,731,857 B1 | 5/2004 | Shelnut et al. | 385/143 |
| 6,751,396 B1 | 6/2004 | Erben | 385/141 |
| 6,856,745 B1 | 2/2005 | Erben et al. | 385/129 |
| 2002/0090572 A1 | 7/2002 | Sooriyakumaran et al. | 430/271.1 |
| 2002/0150368 A1 | 10/2002 | Imoto | 385/132 |
| 2002/0172492 A1* | 11/2002 | Shelnut et al. | 385/143 |
| 2003/0099899 A1 | 5/2003 | Gronbeck et al. | 430/270.1 |
| 2004/0017994 A1 | 1/2004 | Kadama et al. | 385/41 |
| 2004/0105652 A1* | 6/2004 | Shelnut et al. | 385/143 |
| 2004/0218889 A1* | 11/2004 | Shelnut et al. | 385/143 |
| 2005/0111808 A1 | 5/2005 | Shelnut et al. | 385/129 |
| 2005/0163932 A1* | 7/2005 | Zschieschang et al. | 427/258 |
| 2005/0244124 A1 | 11/2005 | Shelnut et al. | 385/129 |

FOREIGN PATENT DOCUMENTS

| | | |
|---|---|---|
| JP | 58-096654 | 6/1983 |
| JP | 63-279245 | 11/1988 |
| JP | 04-271306 | 9/1992 |
| JP | 04-366958 | 12/1992 |
| JP | 6-172533 | 6/1994 |
| JP | 6-256523 | 9/1994 |
| JP | 8-259895 | 10/1996 |
| JP | 8-304644 | 11/1996 |
| JP | 8-327842 | 12/1996 |
| JP | 10-148729 | 6/1998 |
| JP | 10-253845 | 9/1998 |
| JP | 31 33039 B2 | 11/2000 |
| JP | 2003-2279949 | 8/2003 |

OTHER PUBLICATIONS

ASTM D 522-93a (Reapproved 2001), "Standard Test Methods for Mandrel Bend Test of Attatched Organic Coatings", pp. 1-4.

Bagley et al., "The Processing and Use of Organosilicon Polymers for Photonic Applications"; Polymer Engineering and Science, Mid-Sep. 1989, vol. 29, No. 17, pp. 1197-1199.

Brault et al., "Bilevel Polysiloxane Resist for Ion-Beam and Electron-Beam Lithography"; SPIE vol. 539 Advances in Resist Technology and Processing II (1985); pp. 70-73.

* cited by examiner

WAVEGUIDE COMPOSITIONS AND WAVEGUIDES FORMED THEREFROM

CROSS-REFERENCE TO RELATED APPLICATIONS

This application claims the benefit under 35 U.S.C. § 119(e) of U.S. Provisional Application No. 60/524,820, filed Nov. 25, 2003, the entire contents of which are incorporated herein by reference.

BACKGROUND OF THE INVENTION

The present invention relates generally to the field of waveguides. In particular, the present invention relates to compositions suitable for use in forming flexible optical waveguides. The invention further relates to methods of forming flexible optical waveguides. As well, the invention relates to flexible optical waveguides and to electronic devices that include a flexible optical waveguide.

Signal transmission using pulse sequences of light is becoming increasingly important in high-speed communications. For example, optical integrated circuits (OICs) are gaining importance for high bandwidth optical interconnects. As a result, the integration of optical components such as waveguides, filters, optical interconnects, lenses, diffraction gratings, and the like, is becoming increasingly important.

Optical waveguides are typically constructed by surrounding a core material with a clad layer. Optical radiation propagates in the core material because the clad layer has a lower index of refraction than the core material. Waveguides may be used individually or as an array supported on a substrate. The waveguides often perform a passive function on the optical radiation. For example, splitters divide an optical signal in one waveguide into two or more waveguides; couplers add an optical signal from two or more waveguides into a smaller number of waveguides; and wavelength division multiplexing ("WDM") structures separate an input optical signal into spectrally discrete output signals, each of which couples to separate waveguides, usually by employing either phase array designs or gratings. Spectral filters, polarizers, and isolators may be incorporated into the waveguide. As well, waveguides may alternatively contain active functionality, wherein the input signal is altered by interaction with a second optical or electrical signal. Exemplary active functionality includes amplification and switching such as with electro-optic, thermo-optic or acousto-optic devices.

Waveguide substrates include, for example silicon wafers and circuit backplanes for use in server devices. The ability to handle waveguides without crack defects in the core and/or cladding materials is desirable. The cracking property generally is a result of brittleness in the coating material. Many organic polymer-based waveguides such as polyimides are flexible, but have other drawbacks such as moisture absorption, high losses and expense. Silicon-based systems, which address various shortcomings of organic polymer systems, are generally brittle resulting in crack defects as a result of handling.

Photoimageable waveguide cores have been proposed wherein portions of the coating are dissolved in an organic solvent to generate the desired structures. This technique has the drawback of using organic solvents that are difficult to dispose of, waste treat and/or contain in a closed environment. It is therefore desirable to have the option of using aqueous developers to create waveguide structures from photoimageable coatings.

Hybrid silicon-carbon polymer systems have been proposed which address brittleness in interlayer dielectric coatings, especially for pore generating compositions, for microcircuit applications. (See, e.g., Chandross et al, U.S. Pat. No. 6,251,486) disclose a modified methylsilsesquioxane composition for use as a low dielectric material. The methylsilsesquioxane includes dimethyl and phenyl pendant groups to provide better crack resistance than an all methylsilsesquioxane. Thus, crack resistance is achieved for the coated article through incorporation of the pendant groups into the polymer prior to coating. The choice of pendant groups and amounts are limited. It would, therefore, be desirable to improve flexibility by use of a component separate from the polymer in the composition being coated, as this would allow for an increase in the choices and amounts of suitable materials. There is thus a need in the art for compositions suitable for use in manufacturing optical waveguides, which compositions provide beneficial flexibility characteristics while also being developable in an aqueous developer solution. As well, there is a need in the art for waveguides formed from these compositions, for methods of forming such waveguides, and for electronic devices that include such waveguides.

SUMMARY OF THE INVENTION

One aspect of the invention provides compositions suitable for use in manufacturing flexible optical waveguides. The compositions include a polymer, having units of the formula $(RSiO_{1.5})$, wherein R is a substituted and/or unsubstituted organic group and the polymer has a plurality of functional end groups; a first component for altering the solubility of the composition in a dried state upon activation; and a second component containing a plurality of functional groups, chosen from hydroxy, amino, thiol, sulphonate ester, carboxylate ester, silyl ester, anhydride, aziridine, methylolmethyl, silyl ether, and combinations thereof. The second component is present in an effective amount to improve flexibility of the composition in a dried state before and after activation. The solubility of the composition in a dried state is alterable upon activation of the component such that the composition is developable in a developer solution.

In a second aspect of the invention, a flexible optical waveguide is provided. The waveguide has a core and a clad, wherein the core and/or the clad are formed from a composition that includes a polymer having units of the formula $(RSiO_{1.5})$, wherein R is a substituted and/or unsubstituted organic group and the polymer has a plurality of functional end groups; a first component for altering the solubility of the composition in a dried state upon activation; and a second component containing a plurality of functional groups, chosen from hydroxy, amino, thiol, sulphonate ester, carboxylate ester, silyl ester, anhydride, aziridine, methylolmethyl, silyl ether, and combinations thereof. The second component is present in an effective amount to improve flexibility of the composition in a dried state before and after activation. The solubility of the composition in a dried state is alterable upon activation of the component such that the composition is developable in a developer solution.

In a third aspect of the invention, provided is an electronic device that comprises a flexible optical waveguide as described above.

In a fourth aspect of the invention, methods of forming a flexible optical waveguide are provided. The methods involve: (a) forming a layer over a substrate from a composition that includes: a polymer, having: polymerized units of the formula $(RSiO_{1.5})$, wherein R is a substituted and/or unsubstituted organic group and the polymer has a plurality of functional end groups; a first component for altering the solubility of the composition in a dried state upon activation; and a and a second component containing a plurality of functional groups, chosen from hydroxy, amino, thiol, sulphonate ester, carboxylate ester, silyl ester, anhydride, aziridine, methylolmethyl, silyl ether, and combinations thereof; wherein the second component is present in an effective amount to improve flexibility of the composition in a dried state before and after activation; and wherein the solubility of the composition in a dried state is alterable upon activation of the component such that the composition is developable in a developer solution; and (b) activating at least a portion of the layer wherein the layer is a core or a clad layer.

BRIEF DESCRIPTION OF THE DRAWINGS

The present invention will be discussed with reference to the following drawings, in which like reference numerals denote like features, and in which.

DETAILED DESCRIPTION OF THE INVENTION

Figure 1:
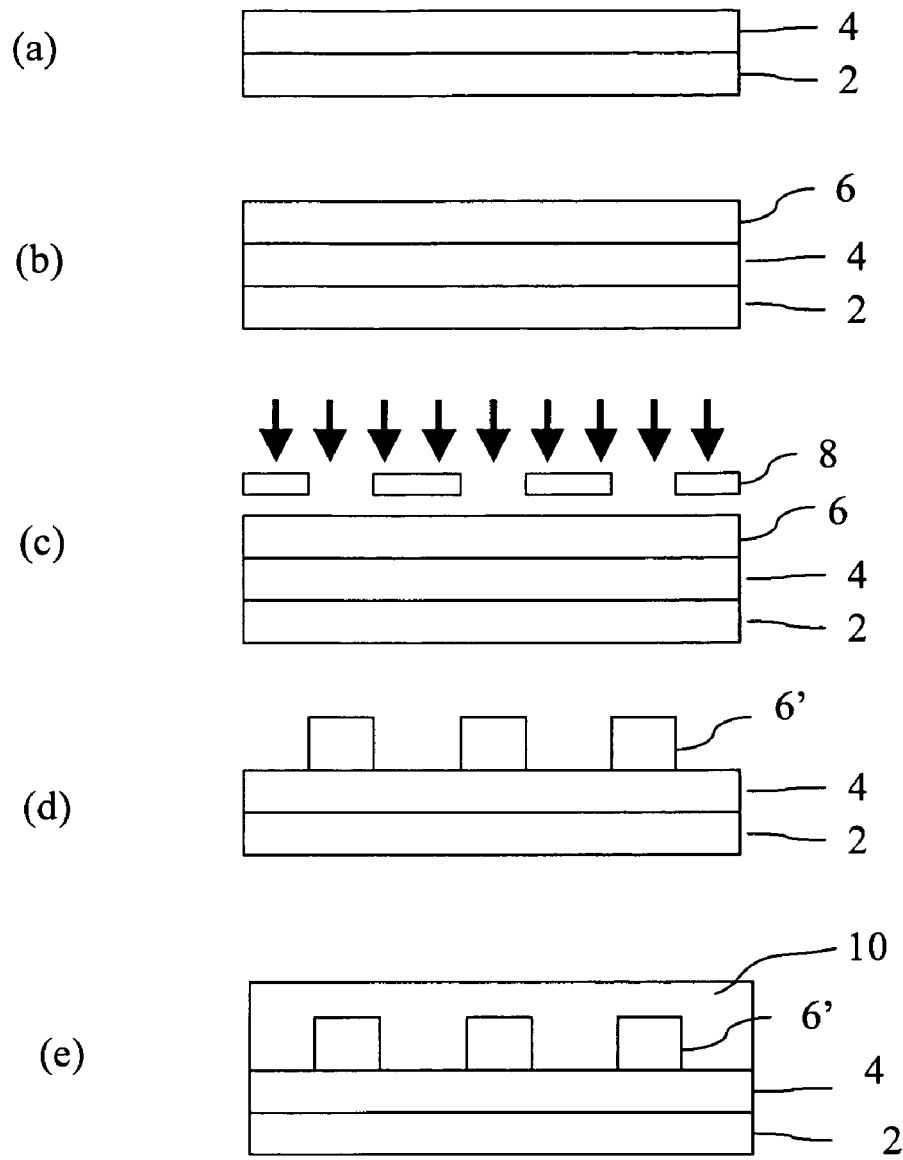
FIG. 1(a)–(e) illustrates in cross-section an optical waveguide at various stages of formation thereof, in accordance with one aspect of the invention.

The present invention provides compositions suitable for use in forming flexible optical waveguides. Unless otherwise specified, amounts for components of the composition are given in weight % based on the composition absent any solvent. As used herein, the term "polymer" includes oligomers, dimers, trimers, tetramers and the like, and encompasses homopolymers and higher order polymers, i.e., polymers formed from two or more different monomer units and heteropolymers. The term "alkyl" refers to linear, branched and cycloalkyl groups, which are substituted or unsubstituted and can include heteroatoms in or on the chain. The term "aromatic" refers to aromatic groups, which are substituted or unsubstituted and can include heterocycles. The terms "a" and "an" mean "one or more".

The term "in a dried state" means a composition containing 10 wt % or less of a solvent, based on the entire composition. The term "wherein the solubility of the composition in a dried state is alterable" means that the solubility of the composition is alterable for any (not necessarily every) solvent content in the range of 10 wt % or less.

The term "developable in an aqueous developer" means that, in the case of a negative-working material, the composition, when (i) coated to a thickness of 8 μm in a dried state on a silicon wafer, and (ii) then placed in a 2N NaOH developer solution, a 2N KOH developer solution or a 2N TMAH developer solution, or a 1N solution thereof, or a 0.7N solution thereof, or even a 0.26N solution thereof at a temperature of from 70 to 180° F. (21 to 82.2° C.) with either static or spray developing at 40 psi impinging spray and is completely dissolved within ten minutes, or within two minutes, or even within one minute, or even within 30 seconds. The composition can additionally or alternatively be developable in an organic solvent.

The term "flexible" or "flexibility" as it relates to the described optical waveguides refers to the ability of the compositions to be coated onto copper foil and, in the dried state, bent around a conical Mandrel bar without cracking or crazing. The specifics of the conical Mandrel test are well know in the coatings industry as exemplified by ASTM D522-93a (Reapproved 2001).

The compositions include a polymer that has polymerized units of the formula $(RSiO_{1.5})$, wherein R is a substituted or unsubstituted organic group, and the polymer has a plurality of functional end groups. The compositions further include a component for altering the solubility of the composition upon activation. The compositions further include a component containing a plurality of functional groups chosen from hydroxy, amino, thiol, sulphonate ester, carboxylate ester, silyl ester, anhydride, aziridine, methylolmethyl, silyl ether, and combinations thereof in an amount effective to improve flexibility of the composition in a dried state before and after activation. The solubility of the composition in a dried state is alterable upon activation of the component such that the composition is developable in an aqueous developer solution.

The polymers useful in the present invention include, for example, siloxanes, silsesquioxanes, and caged siloxanes and combinations thereof. The polymer may be present in the composition in an amount of from 1 to 99.5 wt %, for example from 60 to 98.5 wt %. Exemplary organic groups for R include substituted and unsubstituted alkyl, aryl and heterocyclic groups. The alkyl groups can be straight chain, branched or cyclic having, for example, from 1 to 20 carbon atoms, and typically have from 1 to 20 carbon atoms, such as methyl, ethyl, propyl, isopropyl, t-butyl, t-amyl, octyl, decyl, dodecyl, cetyl, stearyl, cyclohexyl, and 2-ethylhexyl. The alkyl groups can be substituted with heteroatoms in and/or on the alkyl chain, for example, or can be non-aromatic cyclic groups such as cyclopentyl, cyclohexyl, norbonyl, adamantly, piperidinyl, tetrahydrofuranyl and tetrahydrothiophenyl groups. Exemplary aryl groups include those having from 6 to 20 carbon atoms, for example, from 6 to 15 carbon atoms, such as phenyl, tolyl, benzyl, 1-naphthyl, 2-naphthyl and 2-phenanthryl, and can be substituted with heteroatoms. Heterocyclic groups can be aromatic, for example, thiophene, pyridine, pyrimidine, pyrrole, phosphole, arsole, and furane.

Typical for R is a substituted and unsubstituted methyl, ethyl, propyl, cyclopentyl, cyclohexyl, benzyl, phenyl, adamantyl groups, and combinations thereof.

The polymer can take the form of a copolymer or higher order polymer, either random- or block-type. The polymer can include, for example, one or more additional silicon-containing unit, with the proportions for each unit ranging from 1 to 85 wt %, for example, from 15 to 80 wt % or from 25 to 60 wt %, or from 25 to 50 wt %, based on the polymer. The additional units can, for example, be represented as siloxanes, silsesquioxanes, cage siloxanes and/or combinations thereof. For example, the polymer can further include polymerized units of the formula $(R^1SiO_{1.5})$, wherein $R^1$ is a substituted or unsubstituted organic group as described above with respect to R. One of R and $R^1$ can, for example, be chosen from substituted or unsubstituted alkyl groups, and the other of R and $R^1$ chosen from substituted or unsubstituted aryl groups.

The polymer can be, for example, an alkyl silicon polymer such as a copolymer containing methyl silsesquioxane units and butyl silsesquioxane units; an aryl silicon polymer such as a copolymer containing phenyl silsesquioxane units and trifluoromethylphenyl-silsesquioxane units or an aralkyl silicon copolymer such as a copolymer containing methyl and phenyl silsesquioxane units.

As described above, the side chain groups of the polymer can be optionally substituted. "Substituted" means that one or more hydrogen atoms on the side chain groups is replaced by another substituent group, for example, deuterium, halogen such as fluorine, bromine, and chlorine, $(C_1–C_6)$alkyl, $(C_1–C_6)$haloalkyl, $(C_1–C_{10})$alkoxy, $(C_1–C_{10})$alkylcarbonyl, $(C_1–C_{10})$alkoxycarbonyl, $(C_1–C_{10})$alkylcarbonyloxy, alkylamine, alkylsulfur containing materials, and the like. The polymers may contain a wide range of repeating units, either random or block. The polymer units useful in the present invention may have, for example, from 5 to 150 repeating units, typically from about 10 to 35 repeating units; and the siloxane units useful in the present invention may have for example from 5 to 150 repeating units, typically from about 7 to 25 repeating units. Thus, the polymer may vary widely in molecular weight. Typically, the polymers have a weight average molecular weight ($M_w$) of from about 500 to 15,000, more typically from about 1000 to 10,000, even more typically from about 1000 to 5000. It has been found that the dissolution rate of the compositions in accordance with the invention in an aqueous developer decreases with an increase in the molecular weight $M_w$ and number average molecular weight, $M_n$.

The polymers further include two or more functional end groups that allow condensation polymerization to occur. Such end groups can be, for example, hydroxy; alkoxy such as ethoxy, propoxy, isopropoxy; carboxyester, amino, amido, epoxy, imino, carboxyacid, anhydride, olefinic, acrylic, acetal, orthoester, vinyl ether, and combinations thereof. Of these, hydroxy groups are typical. The functional end content in the polymer will depend, for example, on the amount of incorporation of the flexibility-improving component desired. The functional end content can be, for example, from about 0.5 to 35 wt % based on the polymer, for example from about 1 to 10 wt %, or from about 2 to 5 wt %.

The polymer can further, optionally include one or more siloxane units, for example, phenyl or methyl-substituted siloxanes.

The described polymer materials can be prepared by known methods with readily available starting materials. For example, a 50:50 methyl-phenyl silicon containing copolymer can be synthesized by condensation reaction of 50 wt % methyl-triethoxy-silane and 50 wt % phenyl-triethoxy-silane.

A first component for altering the solubility of the composition in the dried state can be an active component that is present in the composition to allow the composition to be alterable in its solubility in a developer. In the case of a negative working material, it is thought that the active component catalyzes coupling of exposed portions of the polymer composition, rendering the coupled portions insoluble in an aqueous developer. The active component typically generates an acid or base upon activation. A wide variety of active components may be used in the present invention, including, but not limited to, photoacid generators, photobase generators, thermal acid generators and thermal base generators. Of these, photoacid and thermal acid generators, components generating an acid upon activation, are typical.

The photoacid generators useful in the present invention can be any compound or compounds which generate acid upon exposure to light. Suitable photoacid generators are known and include, but are not limited to, halogenated triazines, onium salts, sulfonated esters, substituted hydroxyimides, substituted hydroxylimines, azides, naphthoquinones such as diazonaphthoquinones, diazo compounds, and combinations thereof.

Particularly useful halogenated triazines include, for example, halogenated alkyl triazines such as the trihalomethyl-s-triazines. The s-triazine compounds are condensation reaction products of certain methyl-trihalomethyl-s-triazines and certain aldehydes or aldehyde derivatives. Such s-triazine compounds may be prepared according to the procedures disclosed in U.S. Pat. No. 3,954,475 and Wakabayashi et al., *Bulletin of the Chemical Society of Japan,* 42, 2924–30 (1969). Other triazine type photoacid generators useful in the present invention are disclosed, for example, in U.S. Pat. No. 5,366,846.

Onium salts with weakly nucleophilic anions are particularly suitable for use as photoacid generators in the present invention. Examples of such anions are the halogen complex anions of divalent to heptavalent metals or non-metals, for example, antimony, tin, iron, bismuth, aluminum, gallium, indium, titanium, zirconium, scandium, chromium, hafnium, copper, boron, phosphorus and arsenic. Examples of suitable onium salts include, but are not limited to, diazonium salts such as diaryl-diazonium salts and onium salts of group VA and B, IIA and B and I of the Periodic Table, for example, halonium salts such as iodonium salts, quaternary ammonium, phosphonium and arsonium salts, sulfonium salts such as aromatic sulfonium salts, sulfoxonium salts or selenium salts. Examples of suitable onium salts are disclosed, for example, in U.S. Pat. Nos. 4,442,197; 4,603,101; and 4,624,912. Sulfonium salts such as triphenylsulfonium hexafluorophosphate and mixtures thereof are preferred.

The sulfonated esters useful as photoacid generators in the present invention include, for example, sulfonyloxy ketones. Suitable sulfonated esters include, but are not limited to, benzoin tosylate, t-butylphenyl alpha-(p-toluenesulfonyloxy)-acetate, 2,6-dinitrobenzyl tosylate, and t-butyl alpha-(p-toluenesulfonyloxy)-acetate. Such sulfonated esters are disclosed, for example, in the *Journal of Photopolymer Science and Technology,* vol. 4, No. 3,337–340 (1991).

Substituted hydroxyimides which can be used include, for example, n-trifluoromethylsulfonyloxy-2,3-diphenylmaleimide and 2-trifluoromethylbenzenesulfonyloxy-2,3-diphenylmaleimide. Suitable substituted hydroxylimines include, for example, 2-(-nitrilo-2-methylbenzylidene)-(5-hydroxyiminobutylsulfonyl)-thiophene. Azides useful in the present invention include, for example, 2,6-(4-azidobenzylidene) cyclohexanone. Naphthoquinones can include, for example, 2,1-diazonaphthoquinone-4-sulfonate ester of 2,3,4-trihydroxybenzophenone. Among the diazo compounds, 1,7-bis (4-chlorosulonyl phenyl)-4-diazo-3,5-heptanedione can be used.

Photobase generators useful in the present invention can be any compound or compounds which liberate base upon exposure to light. Suitable photobase generators include, but are not limited to, benzyl carbamates, benzoin carbamates, O-carbamoylhydroxyamines, O-carbamoyloximes, aromatic sulfonamides, alpha-lactams, N-(2-allylethenyl)amides, arylazide compounds, N-arylformamides, 4-(orthonitrophenyl) dihydropyridines, and combinations thereof.

Thermal acid generators useful in the present invention can be any compound or compounds which generate an acid on heat activation. The heat can be supplied by indirect methods such as convection heating or by direct heating methods such as laser heating techniques.

Suitable thermal acid generators are known and include, but are not limited to, halogenated triazines, ammonium salts of acids, onium salts, sulfonated esters, substituted hydroxyimides, substituted hydroxylimines, azides, naphthoquinones such as diazonaphthoquinones, diazo compounds, and combinations thereof.

The amount of the component for altering the solubility useful in the present invention, in the case of a negative working material, is any amount sufficient to catalyze coupling of the silicon-containing polymer upon exposure to actinic radiation or heat to render the coupled portion insoluble in an aqueous developer. The active component is present in the composition in an amount of from 0.1 to 25 wt %, for example from 0.1 to 12 wt %.

One or more components for improving the flexibility of the composition in a dried state before and after activation are present in the composition. These flexibility-improving materials contain a plurality of functional groups chosen from hydroxy, amino, thiol, sulphonate ester, carboxylate ester, silyl ester, anhydride, aziridine, methylolmethyl, silyl ether, and combinations thereof. In the flexibility-improving materials, the functional groups are attached to backbone materials. Exemplary backbone materials include substituted and unsubstituted alkyl and aryl hydrocarbons, ethers, acrylates, novolacs, polyimides, polyurethanes, polyesters, polysulfones, polyketones, fullerenes, POSS silicons, nanoparticles, and combinations thereof. The functional groups can be present as end groups on the backbone and/or at one or more locations along the backbone.

Although not to be held to theory, it is believed that the functionalized component intermingles with the polymer to interrupt crystallinity relating brittleness of the coating. During the activation step, the functional groups on the ends or throughout the backbone react with the functional end groups of the polymer causing a flexibilizing link to the activated portion of the composition.

Examples of flexibilizing components are polyols of formula $R^2(OH)_x$ wherein $R^2$ is an organic group chosen from substituted or unsubstituted $(C_2–C_{25})$ alkyl, $(C_7–C_{25})$ aryl, $(C_8–C_{25})$ aralkyl, $(C_6–C_{25})$ cycloalkyl, and combinations thereof, wherein x is 2 or more and does not exceed the number of carbon atoms. When x is 2, examples of the flexibilizing component include glycols, which are 1,2 diols, such as $HOCH_2—CHOH—(CH_2)_y—CH_3$ wherein y can be, for example, from 0 to 22, such as propylene glycol and butylene glycol. Other examples include $\alpha,\omega$-diols such as $HO—(CH_2)_z—OH$ wherein z is, for example, from 2 to 25 such as ethylene glycol, 1,3-propanediol and 1,4-butanediol. When x is 3 examples include glycerin and trimethylolpropane.

$R^2$ can also be a polyether of formula $—O—(CR^3_2)_w—$ wherein w is, for example, from 1 to 13 and $R^3$ is the same or different and can be, for example, H, or a substituted or unsubstituted organic group of formula $C_1–C_{12}$ alkyl, aryl, aralkyl or cycloalkyl. Examples of flexibilizing components include polyether diols of polyethylene oxide, polypropylene oxide, polybutylene oxide, and polytetrahydrofurane.

The flexibility-improving component can have a weight average molecular weight, for example, of from 62 to 5000, for example from 62 to 2000. This component is present in an effective amount to improve the flexibility of the composition in a dried state before and after activation. The specific amount will depend, for example on the backbone and type of and number of functional groups of the flexibility-improving component. This component can, for example, be present in the composition in an amount of from 0.5 to 35 wt %, for example from 2 to 20 wt %.

Other additives may optionally be present in the compositions of the invention including, but are not limited to, surface leveling agents, wetting agents, antifoam agents, adhesion promoters, thixotropic agents, and the like. Such additives are well known in the art for coating compositions. The use of surface leveling agents, for example silicone-base oils such as SILWET L-7604 silicone-base oil available from Dow Chemical Company, in the inventive compositions can be used. It will be appreciated that more than one additive may be combined in the compositions of the present invention. For example, a wetting agent may be combined with a thixotropic agent. Such optional additives are commercially available from a variety of sources. The amounts of such optional additives to be used in the present compositions will depend on the particular additive and desired effect, and are within the ability of those skilled in the art. Such other additives are typically present in the composition in an amount of less than 5 wt %, for example less than 2.5 wt %.

The compositions of the invention can optionally contain one or more organic cross-linking agents. Cross-linking agents include, for example, materials which link up components of the composition in a three-dimensional manner. Aromatic or aliphatic cross-linking agents that react with the silicon-containing polymer are suitable for use in the present invention. Such organic cross-linking agents will cure to form a polymerized network with the silicon-containing polymer, and reduce solubility in a developer solution. Such organic cross-linking agents may be monomers or polymers. It will be appreciated by those skilled in the art that combinations of cross-linking agents may be used successfully in the present invention.

Suitable organic cross-linking agents useful in the present invention include, but are not limited to: amine containing compounds, epoxy containing materials, compounds containing at least two vinyl ether groups, allyl substituted aromatic compounds, and combinations thereof. Typical cross-linking agents include amine containing compounds and epoxy containing materials.

The amine containing compounds useful as cross-linking agents in the present invention include, but are not limited to: melamine monomers, melamine polymers, alkylolmethyl melamines, benzoguanamine resins, benzoguanamine-formaldehyde resins, urea-formaldehyde resins, glycoluril-formaldehyde resins, and combinations thereof.

It will be appreciated by those skilled in the art that suitable organic cross-linker concentrations will vary with factors such as cross-linker reactivity and specific application of the composition. When used, the cross-linking agent(s) is typically present in the composition in an amount of from 0.1 to 50 wt %, for example, from 0.5 to 25 wt % or from 1 to 20 wt %.

The present compositions can optionally contain one or more solvents. Such solvents aid in formulating the present compositions and in coating the present compositions on a substrate. A wide variety of solvents may be used. Suitable solvents include, but are not limited to, glycol ethers, such as ethylene glycol monomethyl ether, propylene glycol monomethyl ether, dipropylene glycol monomethyl ether; esters such as methyl cellosolve acetate, ethyl cellosolve acetate, propylene glycol monomethyl ether acetate, dipropylene glycol monomethyl ether acetate, dibasic esters, carbonates such as propylene carbonate, γ-butyrolactone, esters such as ethyl lactate, n-amyl acetate and n-butyl acetate, alcohols such as n-propanol, iso-propanol, ketones such as cyclohexanone, methyl isobutyl ketone, diisobutyl ketone and 2-heptanone, lactones such as γ-butyrolactone and γ-caprolactone, ethers such as diphenyl ether and anisole, hydrocarbons such as mesitylene, toluene and xylene, and heterocyclic compounds such as N-methyl-2-pyrrolidone, N,N'-dimethylpropyleneurea, or mixtures thereof.

The compositions of the present invention can be prepared by combining, in admixture, the silicon-containing polymer, the catalytic component, and other optional components in any order.

The present compositions are particularly suitable for use in the manufacture of flexible optical waveguides. Optical waveguides can be used in forming opto-electrical devices including, but not limited to, splitters, couplers, spectral filters, polarizers, isolators, multiplexers such as wavelength division multiplexing structures, amplifiers, attenuators, switches, and the like or, on a larger scale, in electronic devices such as printed wiring boards, integrated circuits, interconnects, and the like. The present photodefinable compositions are also particularly useful in manufacturing display devices including lenses as well as optical elements such as mirrors, prisms and connectors. As used herein, the term electronic device is intended to encompass opto-electronic devices, for example, those described above, as well as the aforementioned larger scale devices that include an opto-electronic device.

The waveguides of the present invention may be manufactured as individual waveguides or as an array of waveguides. A method of preparing a waveguide using the inventive composition involves: (a) forming a layer over a substrate from a composition as described above, and (b) activating at least a portion of the layer, wherein the layer is a clad or a core layer. The compositions of the current invention are suitable for use in forming waveguide clad and/or core structures. For purposes of example only, a method of forming a flexible optical waveguide having clad and core structures formed from the inventive compositions will be described. A waveguide is formed by depositing core and first and second cladding layers. The clad of the final structure has a lower index of refraction as compared to the core. Particularly useful waveguides include a core having an index of refraction of from 1.4 to 1.7 and a cladding having an index of refraction of from 1.3 to 1.69.

With reference to FIG. 1, any substrate 2 suitable for supporting a waveguide may be used with the present compositions and constructs. Suitable substrates include, but are not limited to, substrates used in the manufacture of electronic devices such as printed wiring boards and integrated circuits. Particularly suitable substrates include laminate surfaces and copper surfaces of copper clad boards, copper foils, printed wiring board inner layers and outer layers, wafers used in the manufacture of integrated circuits such as silicon, gallium arsenide, and indium phosphide wafers, glass substrates including but not limited to liquid crystal display ("LCD") glass substrates, and substrates that include dielectric coatings, cladding layers, and the like.

A first cladding layer 4 can be formed on the substrate surface 2. The first cladding layer 4 (as well as the other waveguide layers to be described) may be formed from the compositions of the invention, by any technique including, but not limited to, screen printing, curtain coating, roller coating, slot coating, spin coating, flood coating, electrostatic spray, spray coating, or dip coating. When the compositions and constructs of the present invention are spray coated, a heated spray gun may optionally be used. The viscosity of the composition may be adjusted to meet the requirements for each method of application by viscosity modifiers, thixotropic agents, fillers and the like. The first cladding layer is deposited to a thickness in the dried state of from about 1 to 100 μm, for example, from about 10 to 50 μm.

The first cladding layer 4 can be cured, for example, thermally or photolytically depending on the type of active component in the first cladding composition. The thermal curing temperature is from 90° C. to 300° C., for example from 90° C. to 220° C. Such curing typically occurs over a period of from five seconds to one hour. Such curing may be affected by heating the substrate in an oven or on a hot plate. Alternatively the waveguide clad can be flood exposed, for example, with 1 to 2 Joules/cm$^2$ of actinic radiation followed by the thermal cure from 90° C. to 300° C., for example from 90° C. to 220° C.

A core layer 6 is formed on the first clad layer formed from the composition of the invention. The core layer is coated to a thickness of from about 1 to 100 μm, for example, from about 8 to 60 μm. The coated substrate is then soft cured, such as by baking, to remove solvent in the coating. Such curing may take place at various temperatures, depending upon the particular solvent chosen. Suitable temperatures are any that are sufficient to substantially remove any solvent present. The soft curing may be at any temperature from room temperature (25° C.) to 300° C. depending, for example, on the substrate and the thermal budget. Such curing can occur, for example, over a period of from 5 seconds to 60 minutes in an oven or on a hot plate.

After curing, the layer of the present composition can then be imaged by exposure to actinic radiation. Such methods include, for example, contact imaging, projection imaging, and laser direct write imaging, including laser direct write imaging by multiphoton absorption. Multiphoton absorption can, if desired, be used to form 3-dimensional structures within the layer. The exposure pattern, as defined, for example, by mask 8 in FIG. 1, defines the geometry of the core waveguide, which is typically but not necessarily on the order of centimeters to meters in length, and microns to hundreds of microns in width. Following exposure, the composition can be post exposure cured, typically at a temperature of from 40° to 170° C. Curing time may vary but is generally from about 30 seconds to about 1 hour. While not intending to be bound by theory, it is believed that, in the case of a negative-working material, upon exposure to actinic radiation the silicon-containing polymer couples, rendering the exposed areas less soluble in a developer solution than the unexposed areas.

The unexposed areas may be removed, such as by contact with a suitable developer, leaving only the exposed areas remaining on the substrate, thus forming core structures 6 in FIG. 1. The composition can be developable in an aqueous developer solution. Suitable aqueous developers include, for example, alkali metal hydroxides such as sodium hydroxide and potassium hydroxide in water, as well as tetraalkylammonium hydroxide such as tetramethylammonium hydroxide, in water. Such developers are typically used in concentrations from 0.1 to 2N, for example, 0.15 to 1N, or 0.26 to 0.7N. The developer solutions may optionally include one or more known surfactants, such as polyethylene glycol, alkyl sulfonates, and other surfactants well known in the art. The surfactant is typically present in the developer in an amount of from 0.01 to 3 wt %. Antifoaming agents may also be advantageously included in the developer.

The unexposed areas may alternatively be removed leaving only the exposed areas remaining on the substrate by contact with a non-aqueous developer. Suitable non-aqueous developers include, for example, ketones, for example acetone, methyl ethyl ketone, methyl isobutyl ketone, cyclohexanone, 2-octanone, 2-heptanone and methyl isoamyl ketone; alcohols such as ethanol, isopropanol, n-propanol, n-butanol, isobutanol and amylol; esters such as ethyl acetate, ethyl propionate and ethyl lactate; glycol ethers such as ethylene glycol methyl ether, propylene glycol ethyl ether, propylene glycol methyl ether; glycol ether esters such as ethylene glycol monomethyl ether acetate and propylene glycol mono methyl ether acetate; aromatics such as toluene, xylene, chlorobenzene, dichlorobenzene and the like, and combinations thereof.

Semi-aqueous developers can also be used which as combinations of the aqueous developer mentioned above and non-aqueous developers also mentioned above.

Such development may be at a variety of temperatures such as from room temperature to about 65° C., for example from 21 to 49° C. Development time with aggressive agitation can be within ten minutes, for example, within five minutes, within two minutes, within one minute, or within 30 seconds. Development can take place, for example, in a static development chamber or on a conveyorized platform upon which developer is sprayed. Spray pressures can range from 5 to 40 psi, for example, from 10 to 25 psi.

Following development, the present waveguides may undergo a final cure step. The curing can, for example, include a flood exposure, for example, with 1 to 2 Joules/$cm^2$ of actinic radiation. Additionally, or alternatively, the waveguides may be heated at a temperature of from about 130° to 300° C. in air or an inert atmosphere such as nitrogen or argon. Next, a second cladding layer 10 can be formed as described above over the first cladding layer 4 and core structure 6'. The second cladding layer may be the same or different from the first cladding layer. The second cladding layer can be thermally activated and/or photo activated to provide a waveguide structure as described above with respect to the first clad layer. The second cladding layer is typically deposited to a thickness of from about 1 to 100 μm, for example, from about 10 to 50 μm.

Optical waveguides of the present invention possess excellent transparencies at a variety of wavelengths. Thus, the present optical waveguides may be used at, for example, 600 to 1700 nm. It will be appreciated that the present optical waveguides may be advantageously used at other wavelengths. Thus, the present optical waveguides are particularly suited for use in data communications and telecommunications applications.

Figure 2:
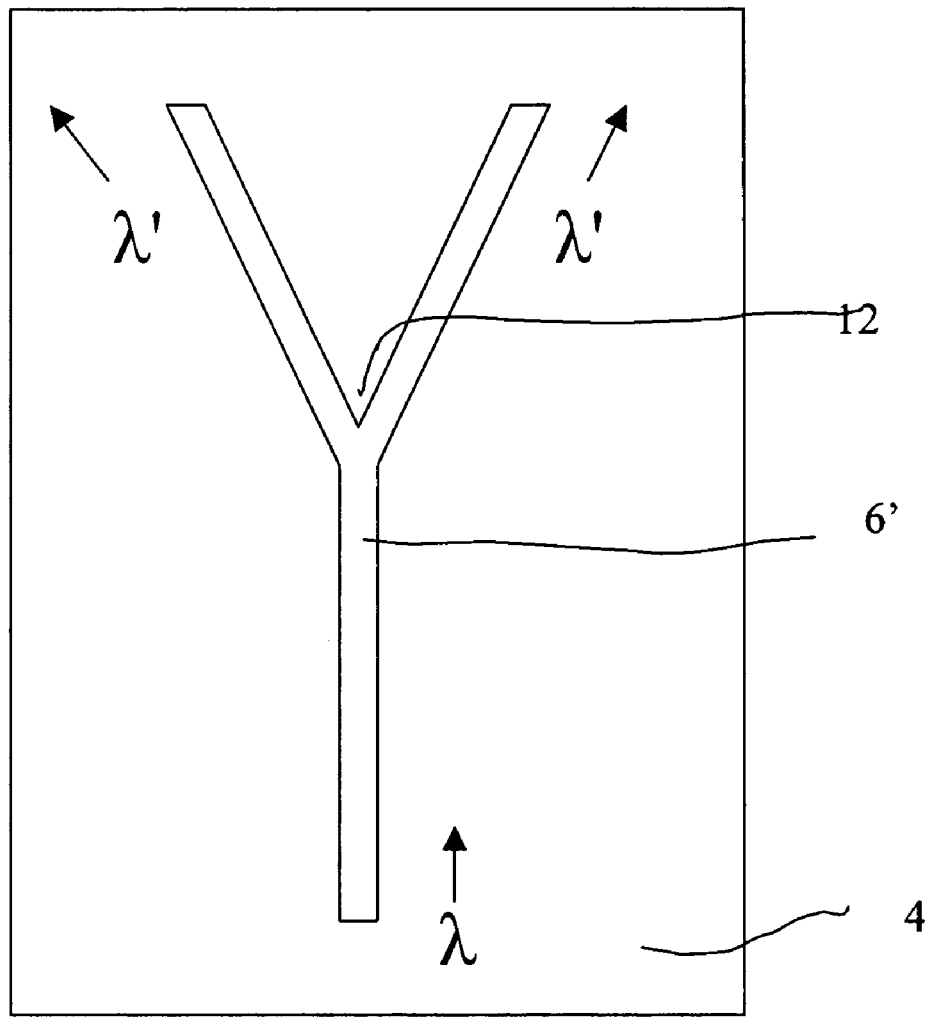
FIG. 2 illustrates an exemplary electronic device in accordance with one aspect of the invention.

FIG. 2 illustrates an exemplary electronic device in accordance with a further aspect of the invention. The electronic device is an optical splitter that includes a waveguide core 6' formed on a waveguide clad 4. An input of signal wavelength, λ, is split at the Y-junction 12 into two light signals, λ', of equal wavelength but at a reduced power amplitude.

The following examples are intended to illustrate further various aspects of the present invention, but are not intended to limit the scope of the invention in any aspect. The wt % as used in the examples are based on full compositions including solvent.

EXAMPLE 1

40.74 wt % propylene glycol monomethyl ether acetate, 53.76 wt % phenyl-methyl-dimethylsilsesquioxane (49:49:2 wt % based on polymer), 5.38 wt % polytetrahydrofurane, 0.11 wt % diphenylnaphthylsulfonium perfluorobutanesulfonate, and 0.01 wt % Dow SILWET L-7604 silicone-base oil were combined in admixture. The composition was coated onto a pumice-scrubbed copper clad laminate using a number 80 drawdown bar. The coated laminate was dried in an oven at 90° C. for 30 minutes. Artwork defining the required waveguide was placed directly on the composition. The artwork included patterns for forming waveguides of various dimensions and shapes, such as linear, branched, and curved shaped waveguides between 2 and 14 cm in length and 15 to 50 μm in width. The coated laminate was exposed at 500 mJ and placed in an oven at 90° C. for 15 minutes. The exposed laminate was then dipped in a 0.7N sodium hydroxide developer solution held at 37.8° C. (100° F.) for 30 seconds. The laminate was then rinsed in de-ionized water and dried. The laminate was heated to 200° C. for 60 minutes in an oven. The waveguide was bent over a 1/16 inch diameter mandrel. The base laminate cracked but the coating did not crack based on visual inspection.

EXAMPLE 2

50 wt % propylene glycol monomethyl ether acetate, 42 wt % phenyl-methyl silsesquioxane (60:40 wt % based on polymer), 5 wt % of dihydroxy-terminated polyethylene oxide, 2.99 wt % triphenylsulfonium hexafluorophosphate, and 0.01 wt % Dow SILWET L-7604 silicone-base oil are combined in admixture. The composition is roller-coated onto 24 inch×36 inch (61 cm×91.4 cm) epoxy laminate, such as is commonly used in printed wiring board manufacture, to a thickness of 60 μm. The composition is then dried in air in a convection oven for 45 minutes at 90° C. Artwork as described in Example 1, but with line widths of 40 to 200 μm, is placed directly on the composition. 1000 mJ/$cm^2$ of actinic radiation is applied to the construction, followed by a post-exposure-bake in air at 90° C. for 30 minutes. The exposed structure is then placed into a spray developer containing 0.7N sodium hydroxide developer solution held at 37.8° C. (100° F.) for a total of 120 seconds. The laminate is rinsed in de-ionized water and dried. The resultant waveguides are flood-exposed with 2000 mJ/$cm^2$ of actinic radiation, followed by hard cure at 180° C. for 120 minutes in air in a convection oven. Flexible optical waveguides are expected to be formed.

EXAMPLE 3

45 wt % propylene glycol monomethyl ether acetate, 25 wt % of trifluoromethyl-phenyl-silsesquioxane (10:90 wt % based on polymer), 15 wt % polytetrahydrofurane, 4.95 wt % benzoin tosylate, and 0.05 wt % Dow SILWET L-7604 silicone-base oil are combined in admixture. The composition is spin-coated at 2500 rpm onto a six-inch silicon dioxide-coated silicon wafer and soft-baked in air on a hot plate for two minutes at 90° C., to a thickness of 8 μm. Artwork as described in Example 1 is placed directly on the composition. 2000 mJ/$cm^2$ of actinic radiation is applied to the construction followed by a post-exposure-bake in air at 90° C. for two minutes. The exposed wafer is then dipped in a propylene glycol monomethyl ether acetate developer solution held at 37.8° C. (100° F.) for 30 seconds. The wafer is then rinsed in de-ionized water and dried. The wafer is heated to 200° C. in air for 10 minutes on a hot plate. Flexible optical waveguides are expected to be formed.

EXAMPLE 4

37 wt % propylene glycol monomethyl ether acetate, 47.99 wt % methyl-phenyl silsesquioxane (50:50 wt % based on polymer), 10 wt % polyvinyl phenol, 5 wt % triphenylsulfonium trifluoromethylsulphonate, and 0.01 wt % Dow SILWET L-7604 silicone-base oil are combined in admixture. The composition is roller-coated onto 24 inch×36 inch (61 cm×91.4 cm) epoxy laminate, such as is commonly used in printed wiring board manufacture, to a thickness of 60 μm. The composition is then dried in air in a convection oven for 45 minutes at 90° C. Artwork as described in Example 1, but with line widths of 40 to 200 µm, is placed directly on the composition. 1000 mJ/cm² of actinic radiation is applied to the construction, followed by a post-exposure-bake in air at 90° C. for 30 minutes. The exposed structure is then placed into a spray developer containing 0.7N sodium hydroxide developer solution held at 37.8° C. (100° F.) for a total of 120 seconds. The laminate is rinsed in de-ionized water and dried. The resultant waveguides are flood-exposed with 2000 mJ/cm² of actinic radiation, followed by hard cure at 180° C. for 120 minutes in air in a convection oven. Flexible optical waveguides are expected to be formed.

EXAMPLE 5

30 wt % propylene glycol monomethyl ether acetate, 54.99 wt % methyl-phenyl silsesquioxane (40:60 wt % based on polymer), 10 wt % poly (1,4-butylene adipate), diol end-capped, 5 wt % triphenylsulfonium trifluoromethylsulphonate, and 0.01 wt % Dow SILWET L-7604 silicone-base oil are combined in admixture. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 30 minutes at 90° C. Artwork as described in Example 1, but with line widths of 40 to 200 µm, is placed directly on the composition. 800 mJ/cm² of actinic radiation is applied to the construction, followed by a post-exposure-bake in air at 90° C. for 30 minutes. The exposed structure is then placed into a spray developer containing 0.7N sodium hydroxide developer solution held at 37.8° C. (100° F.) for a total of 120 seconds. The laminate is rinsed in de-ionized water and dried. The resultant waveguides are hard cured at 180° C. for 120 minutes in air in a convection oven. Flexible optical waveguides are expected to be formed.

EXAMPLE 6

40 wt % propylene glycol monomethyl ether acetate, 49.99 wt % methyl-phenyl silsesquioxane (40:60 wt % based on polymer), 5 wt % polycaprolactone triol, 5 wt % triphenylsulfonium trifluoromethylsulphonate, and 0.01 wt % Dow SILWET L-7604 silicone-base oil are combined in admixture. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 30 minutes at 90° C. Artwork as described in Example 1, but with line widths of 40 to 200 µm, is placed directly on the composition. 800 mJ/cm² of actinic radiation is applied to the construction, followed by a post-exposure-bake in air at 90° C. for 30 minutes. The exposed structure is then placed into a spray developer containing 0.7N sodium hydroxide developer solution held at 37.8° C. (100° F.) for a total of 120 seconds. The laminate is rinsed in de-ionized water and dried. The resultant waveguides are hard cured at 180° C. for 120 minutes in air in a convection oven. Flexible optical waveguides are expected to be formed.

EXAMPLE 7

Clad Layer

A clad layer composition was formed by combining in admixture 40.61 wt % propylene glycol monomethyl ether acetate, 53.47 wt % phenyl-methyl-dimethylsilsesquioxane (49:49:2 wt % based on polymer), 5.35 wt % polytetrahydrofurane, 0.56 wt % amine blocked dodecylphenylsulphate and 0.01 wt % Dow SILWET L-7604 silicone-base oil. The composition was coated onto a mechanically scrubbed copper laminate using a number 80 drawdown bar. The laminate was dried in an oven for 30 minutes at 90° C. followed by a hard baked at 180° C. for 1 hour in the oven.

Core

The clad layer was coated with a core composition formed by admixing 35.75 wt % propylene glycol monomethyl ether acetate, 56.44 wt % phenyl-methyl-dimethylsilsesquioxane (49:49:2 wt % based on polymer), 6.24 wt % polytetrahydrofurane, 1.56 wt % diphenylnaphthylsulfonium perfluorobutanesulphate and 0.01 wt % Dow SILWET L-7604 silicone-base oil. The coated laminate was dried in an oven at 90° C. for 30 minutes. Artwork defining the required waveguide was placed directly on the composition. The artwork included patterns for forming waveguides of various dimensions and shapes, such as linear, branched, and curved shaped waveguides between 2 and 14 cm in length and 15 to 50 µm in width. The coated laminate was exposed at 500 mJ and placed in an oven at 90° C. for 15 minutes. The coated laminate was then dipped in a 0.7N sodium hydroxide developer solution held at 37.8° C. for 30 seconds. The coated laminate was then rinsed in de-ionized water and dried. The coated laminate was heated to 200° C. for 60 minutes in an oven. The waveguide was bent over a ¹⁄₁₆ inch diameter mandrel. The base laminate cracked but the clad and core layers did not crack based on visual inspection.

EXAMPLE 8

Clad (1) Layer

A first cladding layer composition is formed by combining in admixture 39 wt % propylene glycol monomethyl ether acetate, 48.5 wt % phenyl-methyl-dimethylsilsesquioxane (35:65 wt % based on polymer), 7.5% dihydroxy-terminated polyethylene oxide, 4.99 wt % of amine blocked dodecylphenylsulphate, and 0.01 wt % Dow SILWET L-7604 silicone-base oil. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 45 minutes at 90° C. The first-clad-coated substrate is heated at 180° C. for 1.5 hours.

Core

The first cladding layer is coated with the core composition of Example 2 and is patterned and cured as described in Example 2

Clad (2) Layer

A second cladding layer composition is formed over the patterned core and first cladding layer using the same composition and procedures used in forming the first cladding layer, except the thickness of the second cladding layer after the soft-bake is 60 µm. Flexible optical waveguides are expected to be formed.

EXAMPLE 9

Clad (1) Layer

A first cladding layer composition is formed by combining in admixture of 50 wt % propylene glycol monomethyl ether acetate, 40.99 wt % phenyl-methyl silsesquioxane (40:60 wt % based on polymer), 4 wt % polytetrahydrofurane, 5 wt % triphenylsulfonium trifluoromethylsulphate and 0.01 wt % Dow SILWET L-7604 silicone-base oil. The composition is spin-coated at 2000 rpm onto a six-inch silicon dioxide-coated silicon wafer and soft-baked in air on a hot plate for two minutes at 90° C., to a thickness of 8 µm. The composition is exposed to 800 mJ, heated at 90° C. for 2 minutes on a hot plate. The composition is then hard-baked in air on a hot plate for ten minutes at 200° C.

Core

The first cladding layer is coated with the core composition of Example 3 and patterned and cure as described in Example 3.

Clad (2) Layer

A second cladding layer composition is formed over the patterned core and first cladding layer using the same composition and procedures used in forming the first cladding layer, except the thickness of the second cladding layer after the soft-bake is 10 µm. Flexible optical waveguides are expected to be formed.

EXAMPLE 10

Clad (1) Layer

A first cladding layer composition is formed by combining in admixture 39 wt % propylene glycol monomethyl ether acetate, 56 wt % phenyl-methyl silsesquioxane (50:50) wt % based on polymer), 10% dihydroxy-terminated polypropylene glycol, 4.99 wt % of amine blocked dodecylphenylsulphate, and 0.01 wt % Dow SILWET L-7604 silicone-base oil. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 45 minutes at 90° C. The first-clad-coated substrate is heated at 180° C. for 1 hour.

Core

The first cladding layer is coated with the core composition of Example 4 and is patterned and cured as described in Example 4.

Clad (2) Layer

A second cladding layer composition is formed over the patterned core and first cladding layer using the same composition and procedures used in forming the first cladding layer, except the thickness of the second cladding layer after the soft-bake is 60 µm. Flexible optical waveguides are expected to be formed.

EXAMPLE 11

Clad (1) Layer

A first cladding layer composition is formed by combining in admixture 39 wt % propylene glycol monomethyl ether acetate, 56 wt % phenyl-methyl silsesquioxane (50:50) wt % based on polymer), 10% dihydroxy-terminated polypropylene glycol, 4.99 wt % of amine blocked dodecylphenylsulphate, and 0.01 wt % Dow SILWET L-7604 silicone-base oil. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 45 minutes at 90° C. The first-clad-coated substrate is heated at 180° C. for 1 hour.

Core

The first cladding layer is coated with the core composition of Example 5 and is patterned and cured as described in Example 5.

Clad (2) Layer

A second cladding layer composition is formed over the patterned core and first cladding layer using the same composition and procedures used in forming the first cladding layer, except the thickness of the second cladding layer after the soft-bake is 60 µm. Flexible optical waveguides are expected to be formed.

EXAMPLE 12

Clad (1) Layer

A first cladding layer composition is formed by combining in admixture 39 wt % propylene glycol monomethyl ether acetate, 56 wt % phenyl-methyl silsesquioxane (50:50) wt % based on polymer), 10% dihydroxy-terminated polypropylene glycol, 4.99 wt % of amine blocked dodecylphenylsulphate, and 0.01 wt % Dow SILWET L-7604 silicone-base oil. The composition is roller-coated onto 24 inch×36 inch (61 cm×91.4 cm) epoxy laminate, such as is commonly used in printed wiring board manufacture, to a thickness of 50 µm. The composition is then dried in air in a convection oven for 45 minutes at 90° C. The first-clad-coated substrate is heated at 180° C. for 1 hour.

Core

The first cladding layer is coated with the core composition of Example 6 and is patterned and cured as described in Example 6.

Clad (2) Layer

A second cladding layer composition is formed over the patterned core and first cladding layer using the same composition and procedures used in forming the first cladding layer, except the thickness of the second cladding layer after the soft-bake is 60 µm. Flexible optical waveguides are expected to be formed.

While the invention has been described in detail with reference to specific embodiments thereof, it will be apparent to one skilled in the art that various changes and modifications can be made, and equivalents employed, without departing from the scope of the claims.

What is claimed is:

1. A composition comprising:
   a polymer, comprising units of the formula $(RSiO_{1.5})$ wherein R is a substituted or unsubstituted organic group, and a plurality of functional end groups;
   a first component for altering the solubility of the composition in a dried state upon activation; and
   a second component containing a plurality of functional groups chosen from hydroxy, amino, thiol, sulphonate ester, carboxylate ester, silyl ester, anhydride, aziridine, methylolmethyl, silyl ether, and combinations thereof, wherein the second component is present in an effective amount to improve flexibility of the composition in a dried state before and after activation.

2. The composition according to claim 1, wherein the polymer further comprises units of the formula $(R^1SiO_{1.5})$, wherein $R^1$ is a substituted or unsubstituted organic group, and is different from R.

3. The composition according to claim 1 wherein the second component comprises a material chosen from substituted and unsubstituted alkyl and aryl hydrocarbons, ethers, acrylates, novolacs, nanoparticles, polyimides, polyurethanes, polyesters, polysulfones, polyketones, fullerenes, POSS silicons, and combinations thereof.

4. The composition according to claim 1, wherein the second component is a polyol.

5. The composition according to claim 1, wherein the second component is a polyether-diol.

6. The composition according to claim 1, wherein the first component generates an acid upon activation.

7. The composition according to claim 1, wherein the composition in the dried state is aqueous developable.

8. A flexible optical waveguide, comprising a core and a clad, wherein the core and/or the clad are formed from a composition comprising:
- a polymer, comprising units of the formula $(RSiO_{1.5})$ wherein R is a substituted or unsubstituted organic group, and a plurality of functional end groups;
- a first component for altering the solubility of the composition in a dried state upon activation;
- a second component containing a plurality of functional groups chosen from hydroxy, amino, thiol, sulphonate ester, carboxylate ester, silyl ester, anhydride, aziridine, methylolmethyl, silyl ether, and combinations thereof, wherein the second component is present in an effective amount to improve flexibility of the composition in a dried state before and after activation.

9. The flexible optical waveguide according to claim 8, wherein the polymer further comprises units of the formula $(R^1SiO_{1.5})$, wherein $R^1$ is a substituted or unsubstituted organic group, and is different from R.

10. The flexible optical waveguide according to claim 8, wherein the second component comprises a material chosen from substituted and unsubstituted alkyl and aryl hydrocarbons, ethers, acrylates, novolacs, nanoparticles, polyimides, polyurethanes, polyesters, polysulfones, polyketones, fullerenes, POSS silicons, and combinations thereof.

11. The flexible optical waveguide according to claim 8, wherein the second component is a polyol.

12. The flexible optical waveguide according to claim 8, wherein the second component is a polyether-diol.

13. An electronic device, comprising a flexible optical waveguide according to claim 8.

14. A method of forming a flexible optical waveguide comprising a core and a clad, the method comprising:
- (a) forming a layer over a substrate from a composition comprising a polymer, comprising units of the formula $(RSiO_{1.5})$ wherein R is a substituted or unsubstituted organic group, and a plurality of functional end groups; and
- a first component for altering the solubility of the composition in a dried state upon activation;
- a second component containing a plurality of functional groups chosen from hydroxy, amino, thiol, sulphonate ester, carboxylate ester, silyl ester, anhydride, aziridine, methylolmethyl, silyl ether, and combinations thereof, wherein the second component is present in an effective amount to improve flexibility of the composition in a dried state before and after activation, and
- (b) activating at least a portion of the layer, wherein the layer is a core or a clad layer.

15. The method according to claim 14 wherein the second component comprises a material chosen from substituted and unsubstituted alkyl and aryl hydrocarbons, ethers, acrylates, novolacs, nanoparticles, polyimides, polyurethanes, polyesters, polysulfones, polyketones, fullerenes, POSS silicons, and combinations thereof.

16. The method according to claim 14, wherein the second component is a polyol.

17. The method according to claim 14, wherein the layer is a core layer, and wherein
- (b) comprises activating a portion of the core layer, and further comprising:
- (c) developing the core layer to form a core structure.

18. The method according to claim 14, wherein the layer is a clad layer, and wherein
- (b) comprises activating the entire clad layer.

19. The method according to claim 14, wherein the layer is a first clad layer, and further comprising:
- (c) forming a core layer over the clad layer from a second composition as defined in (a) that is the same or different from the composition of (a);
- (d) activating a portion of the core layer;
- (e) developing the core layer to form a core structure; and
- (f) forming a second clad layer over the core structure from a third composition as defined in (a) that is the same or different from the compositions of (a) and/or (c).

20. The method according to claim 19, wherein the composition in the dried state is aqueous developable.

* * * * *